March 31, 1936.  A. L. SMITH  2,035,927
MATERIAL HANDLING MECHANISM
Filed April 8, 1933
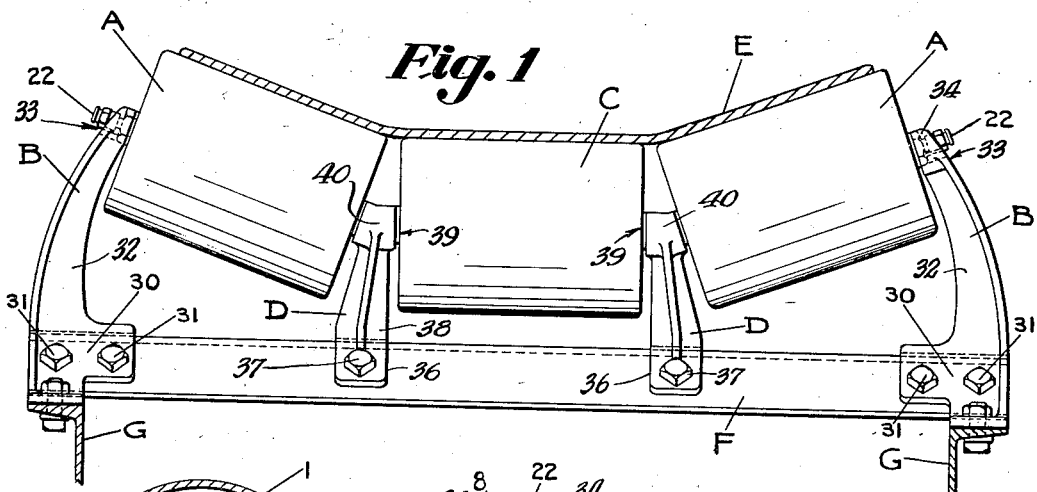
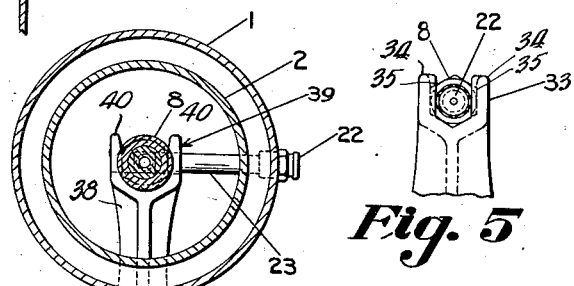
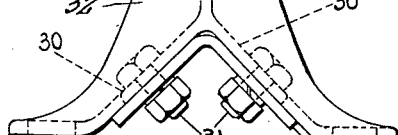
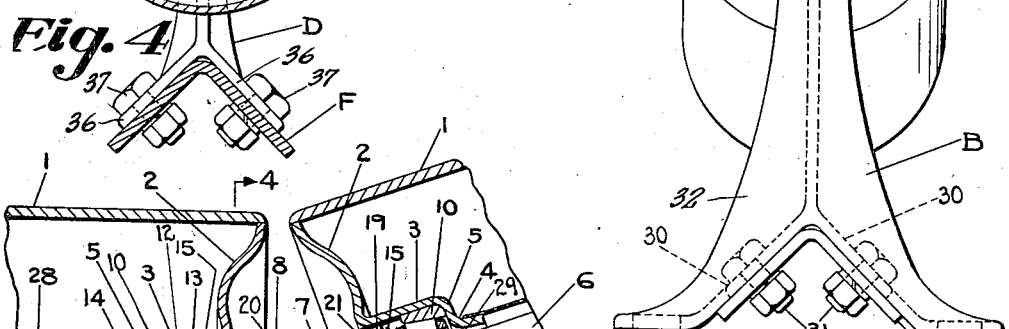
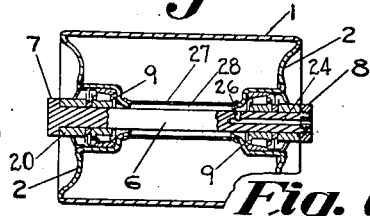
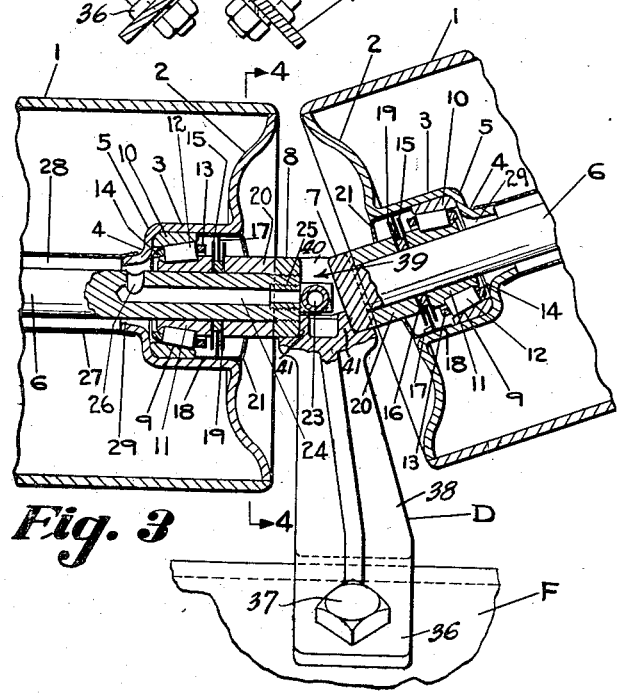
INVENTOR:
Archibald L. Smith,
BY
Chas. M. Nissen,
ATT'Y.

Patented Mar. 31, 1936

2,035,927

UNITED STATES PATENT OFFICE 2,035,927

MATERIAL HANDLING MECHANISM

Archibald L. Smith, Columbus, Ohio, assignor to The Jeffrey Manufacturing Company, a corporation of Ohio Application April 8, 1933, Serial No. 665,131

3 Claims. (Cl. 308—20)

In material handling mechanism of the type herein described, there is employed an endless belt conveyor which passes over carriers comprising rollers supported on suitable standards in end to end relation, forming roller units extending transversely of the belt, for supporting the belt. Each of these units comprises at least one intermediate roller, together with end rollers, and, where it is desired to impart a trough-like shape to the belt, the end rollers are inclined upwardly in opposite directions.

In continued service it becomes necessary from time to time to remove certain of the rollers of the respective units for repair, replacement of worn parts, adjustment of the parts, or for other purposes. A considerable amount of manipulation is required for the accomplishment of these operations.

In view of the fact that a considerable amount of manipulation is required for the adjustment of the parts of the roller to take up wear and clean those parts, and also because of the fact that it is difficult in the usual constructions to assure an adequate supply of lubricant around the parts subjected to wear, it frequently happens that there is considerable difficulty experienced in keeping the rollers in proper working condition, and a simplification of the required operations and an increase in effectiveness of lubrication are highly desirable.

The present invention has for one of its objects the provision of a novel construction in which the lubricating of the parts of rollers of this type may be very materially expedited, and incidentally, the invention provides adjusting devices for adjusting the wearing parts of a roller in a longitudinal direction without requiring that the roller be completely demounted from its supports.

Generally speaking, from the standpoint of lubrication, the invention embraces a construction whereby an effective pool of lubricant is maintained about all of the parts subjected to wear, the lubricant being supplied from one end of the roller only, instrumentalities being provided for feeding the lubricant longitudinally of the roller from end to end thereof, so that an ample supply of lubricant for all working parts is assured at all times.

The usual shaft is employed as a means for introducing the lubricant to the parts to be lubricated, and, incidentally, this shaft is provided with means for longitudinally adjusting the wearing parts, to take up wear therebetween without requiring the complete removal of the roller from its supports.

Another object of the invention is to provide an extremely simple and rugged bracket assembly which will effectively support the axle of a roller while preventing turning thereof and also take care of any axial thrust of said roller, while maintaining the rollers and the axles thereof out of contact with each other and still provide for easy and ready removal of the rollers without requiring any appreciable pivotal movement.

The invention will be more readily understood from a consideration of the accompanying drawing, which illustrates one form of improved construction which the present invention may take.

In this drawing Fig. 1 represents an elevation of a belt troughing idler unit, showing in general an arrangement of the rollers of the unit, and the mounting thereof, the belt itself being shown in section;

Fig. 2 is an end view of one of the terminal rollers of the unit, showing in detail the mounting thereof;

Fig. 3 is a fragmentary section taken through adjacent ends of the contiguous rollers, the shaft of one being shown partly broken away to illustrate the construction thereof for supplying lubricant to the bearing mechanism of the roller;

Fig. 4 is a sectional view taken on the line 4—4 of Fig. 3, looking in the direction of the arrows;

Fig. 5 is a fragmentary view showing the mounting of the terminal roller shaft upon a suitable supporting end bracket; and Fig. 6 is a longitudinal sectional view through one of the rollers taken on the axis of the roller.

Referring more particularly to the drawing, it will be seen that, as illustrated, the roller unit is composed of terminal rollers A, mounted on end brackets B, and an intermediate roller C, supported on intermediate brackets D, these intermediate brackets also supporting the terminal rollers A. These terminal rollers are inclined, as shown, to give a trough-shape to the conveyor belt E.

This invention is concerned principally with the construction of the rollers, and as each of the rollers is similar to the others, only one of them need be described in detail.

It will be apparent that each roller comprises a cylindrical shell 1, each end of which is closed by an end gudgeon 2, having an annular interiorly projecting, re-entrant portion 3, the diameter of which is restricted as shown at 4, to form a restricted flange and an annular shoulder 5. Extending from end to end through each roller and projecting from each end thereof sufficiently to rest upon the supporting brackets, is the axial shaft 6. One end of this shaft is provided with a polygonal head 7, the other end of the shaft being threaded to receive a nut 8. The roller is carried by this polygonal head and nut.

The interiorly projecting portion 3 of the end gudgeons forms a housing for anti-friction bearing 9, there being positioned such a bearing at each end of the roller. Each bearing comprises a race having a rotatable section 10 and a stationary section 11, between which sections are positioned roller bearings 12. The section 10 is positioned within the housing 3 by pressing it in place against the shoulder 5, the resiliency of the housing securing the race section 10 properly in place. The section 11 of the bearing forms a sleeve around the shaft 6, and is held in position in any suitable manner. The bearing rollers 12 are maintained in position between annular abutments 13 and 14.

For maintaining a pool of lubricant around the bearings, the housing 3 is provided with a labyrinth seal to prevent leakage of lubricant therefrom. The seal is made up of an assembly of parts including a ring 15 tightly engaging the shaft 6 and pressed closely against the sleeve 11. A spacer 16 holds the ring 15 in place. Against the spacer 16 is pressed a cup-like member 17, the side 18 of which closely engages the housing 3 and also section 10 of the bearing race. Also positioned against the spacer 16 and against the outer flat side thereof is a second ring 19 held in position by a sleeve 20. Against this sleeve, and in wiping engagement therewith, is a second cuplike seal 21, closely bearing against the previously mentioned cup seal 17.

The sleeve 20 is secured by the head 7 of shaft 6, or by the nut 8, as the case may be, the tightness of which engagement is controlled by the adjustment of the nut 8.

It will therefore be seen that as the roller rotates, the cups 17 and 21 being in frictional engagement with the housing 3 rotate therewith, and that the the engagements between the cup 17 and spacer 16 and between the cup 21 and sleeve 20, are wiping engagements, although sufficiently close to prevent passage of lubricant, which is effectively dammed up within the housing.

For supplying lubricant to each housing, each roller is provided at one end thereof with a fitting of a standard type for connecting a pressure lubricating device or grease gun, thereto. This fitting is indicated at 22 and, in the case of the terminal rollers, it is aligned with the shaft 6, whereas in the intermediate roller it projects laterally therefrom and is provided with a conduit 23, for supplying lubricant in the manner about to be described.

It will be observed that the shaft 6 is tubular as indicated at 24 for a portion of its length, the fitting 22 being either in direct communication with the tubular portion 24, or else communicating therewith through the conduit 23, leading into a bushing 25, threadedly secured in the interior of the tubular portion of the shaft. A port 26 communicates between the tubular portion 24 of the shaft and the interior of the bearing housing 3.

Extending around the shaft 6, but spaced therefrom, from end to end of the roller so as to interconnect the bearing housings 3 at each end of the roller, is a sleeve 27, defining an annular lubricant channel 28, through which lubricant flows from the intake end of the roller to the farther end, it being understood that the housings 3 are open to the channel 28 as indicated by the space 29. Therefore, as lubricant is pumped through fittings 22 into the tubular end 24 of the shaft 6, it passes from this tubular end through port 26 to flood the interior of one of the housings 3, thence along channel 28 into the other bearing housing, so that both housings 3 and channel 28 will become filled with lubricant.

The end brackets B comprise an integral member having angularly-disposed foot pieces 30, secured by bolts 31 to the angle base support F mounted on stringers G. Each of the terminal brackets B has an arcuate body portion 32 extending upwardly from said foot pieces 30 and a bearing portion 33 adjacent its top. The bearing portion 33 comprises a U-shaped member, formed integral with the body portion, by parallel side walls 34, 34 laterally spaced from the axis of the roller shaft 6. The bottom of said bearing portion is grooved V-shaped and with the side walls 34, 34 is of a configuration to conform with the polygonal nut 8 forming one head of the shaft 6, whereby said shaft and nut are not only supported but are maintained against rotation, the nut being drawn tight against said shaft. Adjacent the outer ends of said side walls 34, 34 and extending inwardly of said bearing portion is a pair of flange abutments 35, 35 against which the nut 8 is adapted to abut and to prevent any axial movement of the shaft 6 outward. Such a movement might otherwise occur due to heavy loading along one of the side rollers A with a consequent tendency for movement of the belt E and a resulting outward movement of the opposed side roller A.

The intermediate brackets D comprise an integral member having angularly-disposed foot pieces 36, secured by bolts 37 to the angle base F. Each of said intermediate brackets D has a body portion 38 extending upwardly from said foot pieces 36 and an integral bearing portion 39 adjacent its top. The bearing portion 39 comprises a U-shaped member, open at both sides or ends, to receive the head 7 and the nut 8 of the rollers A and C respectively, at opposite sides or ends. Said U-shaped member is formed by parallel walls 40, 40 laterally spaced from the axis of the roller shafts 6 of rollers A and C. The bottom of said bearing portion is grooved V-shaped for a distance inwardly from each end sufficient to receive the head 7 or nut 8 and with the side walls 40 is of a configuration to conform with the polygonal head 7 or nut 8 of a shaft 6, whereby said shaft head or nut is not only supported but is maintained against rotation. One of the side plates 40 is grooved intermediate its ends to allow projection therethrough of the laterally-extending lubricating conduit 23, as best illustrated in Fig. 4.

Projecting upwardly and inwardly from the bottom wall of the bearing portion 39 and extending between the side walls 40, 40 is a pair of flange abutments 41, 41. Said abutments receive any axial thrust on the shafts 6 of rollers A or C and prevent axial movement of said rollers.

It is manifest that the brackets B and D provide simple and rugged means to support the rollers A and C to prevent turning of the shafts of said rollers and to restrict the axial movement thereof, while providing for ready removal of said rollers by the simple expedient of lifting any roller from the brackets without requiring any tools whatever and without requiring any appreciable pivotal movement of a roller. In addition, any roller may be individually removed without in any way disturbing any other roller or any bracket.

Instead of making the head 7 integral with the shaft 6, the head may be welded to the shaft or secured by a suitable pin, or in any other desired manner.

It will be apparent that the sleeves 11 and 20 additionally form reinforcing members for the axle 6, not only strengthening the axle around the hollow portion thereof, but also enabling the use of an axle of smaller diameter than would otherwise be possible.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. Material handling mechanism comprising the combination with a roller, of an axle extending through the roller, the roller having re-entrant end portions terminating in a part of restricted diameter but spaced from the axle, a sleeve interconnecting the said end portions and tightly fitted over the restricted parts thereof, antifriction bearing mechanism housed within the re-entrant end portions, means enabling the said bearing mechanism to be supplied with lubricant, and instrumentalities for preventing substantial leakage of lubricant from around the bearing mechanism, the said instrumentalities including cup-like sealing members rotatively associated with the cylinder and sealing the re-entrant end portions, fixed flat rings disposed within the cup members and spaced on the axle by a spacer, said rings cooperating with said cup members in forming a substantially lubricant-tight joint therebetween, reinforcing sleeve members for the axle interlocking the said cup members and rings in position, and means for adjusting the said instrumentalities.

2. Material handling mechanism comprising the combination with a cylindrical roller, of end gudgeons for the roller each having a re-entrant portion, a supporting axle for the roller extending through the re-entrant portions, bearing mechanism for the roller, the said re-entrant portions forming housings for the bearing mechanism, means enabling lubricant to be supplied to the housings, and sealing devices for sealing the housings against leakage of lubricant, the devices including contiguously positioned lubricant cup members rotatably carried by the housings, and spaced stationary ring members mounted on the axle, one on each side of a spacer, and in cooperative association with the cup members, one of the cup members extending between the ring members and forming therewith a labyrinth lubricant seal.

3. In a belt conveyor roller assembly, the combination with a cylindrical roller, of an end plate for said roller having a re-entrant portion forming a bearing housing, an axle for supporting said roller, anti-friction bearing means for carrying said roller on said axle including an outer race mounted in said housing for rotation with said roller, an inner race mounted on said axle, roller bearings between said races, a grease seal for said bearing means comprising a pair of rings carried on said axle, a spacer on said axle positioned between said rings for spacing them apart, a pair of rings carried by said roller one of which is within said bearing housing and positioned between said first named pair of rings and in overlapping relation therewith and the other of which substantially closes the outer opening to said re-entrant portion, and a nut screw threaded on said axle for clamping said first named pair of rings, said spacer and said inner race and for adjusting said bearing by adjusting the position of said inner race on said axle, said nut being formed to be received in a supporting standard to support said axle and prevent rotation thereof.

ARCHIBALD L. SMITH.